UNITED STATES PATENT OFFICE.

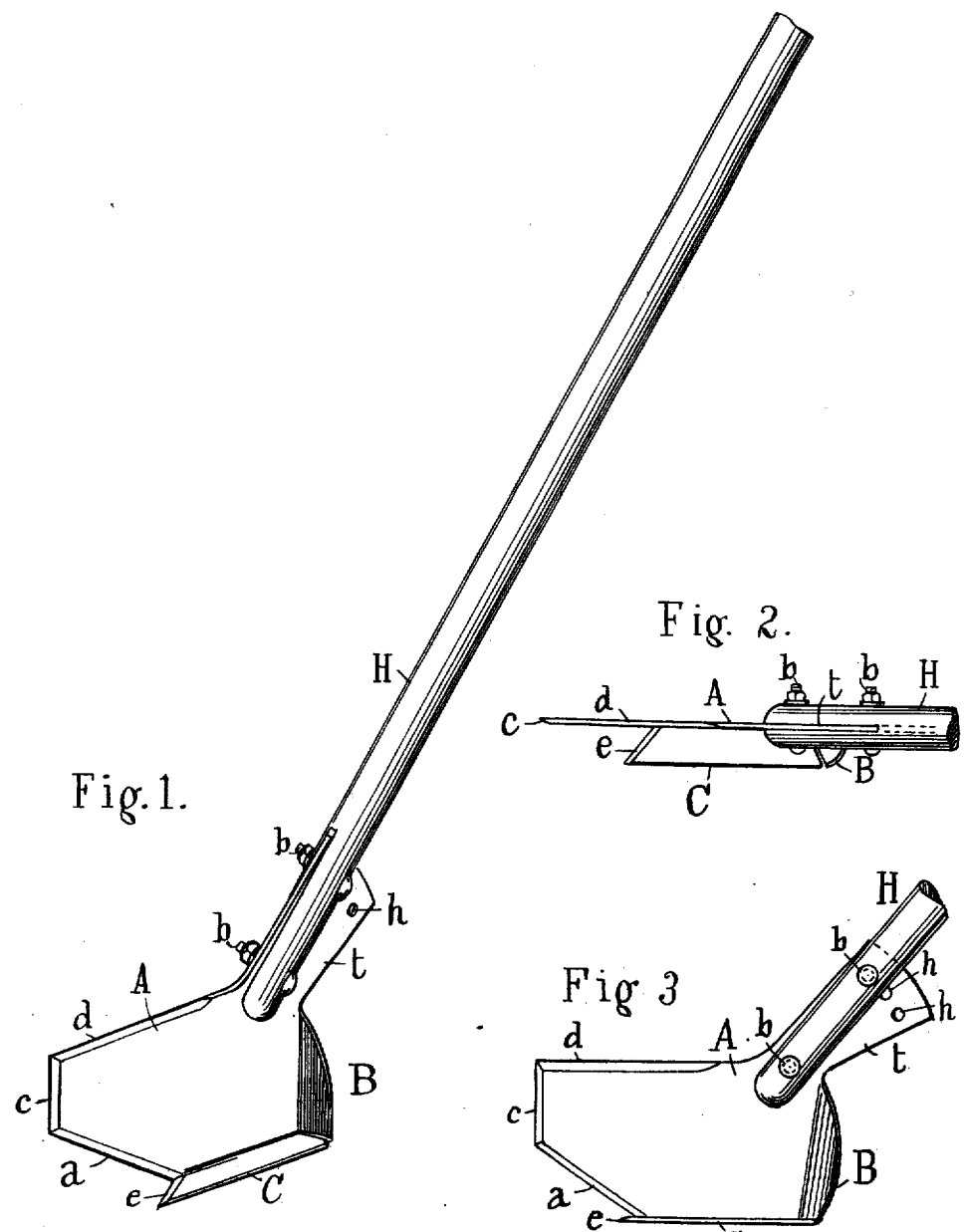

FREDERICK HEATHER, OF NEW YORK, N. Y.

EDGE-CUTTER FOR LAWNS.

No. 903,085.     Specification of Letters Patent.     Patented Nov. 3, 1908.

Application filed June 30, 1908. Serial No. 441,247.

*To all whom it may concern:*

Be it known that I, FREDERICK HEATHER, a citizen of the United States of America, and a resident of Little Neck, in the city of New York, borough and county of Queens, and State of New York, have invented certain new and useful Improvements in Edge-Cutters for Lawns, of which the following is a specification.
The object of this invention is to provide an implement for trimming the sod at the edges of lawns adjoining driveways, walks, flower-beds, and other places which are to be kept free from grass.
Further objects are to provide a tool which is readily operated by hand so that it may be propelled easily and accurately along any desired line, will cut a clean vertical edge without wavering either horizontally or vertically, and will throw the detached sod away from the trimmed edge so that it can be easily gathered up.

In the accompanying sheet of drawings, which forms a part of this application, Figure 1 is a perspective view of an edge cutter embodying my invention, the upper end of the handle being broken away. Fig. 2 is a top view of the same. Fig. 3 is a side view of the same.
The implement comprises in combination a vertically disposed blade A with a forwardly and downwardly directed cutting edge $a$ and a sidewardly bent rear edge B. A forwardly facing cutting edge $c$ is provided to assist the inclined edge when the vertical cut is exceptionally deep. The upper edge $d$ is also sharpened so that the implement may be turned over and used for cutting out sod. The vertical blade is provided at the upper rear corner with a tang $t$ which engages the slotted end of a handle H. The handle is secured by bolts $b\ b$, one passing through the forked ends of the handle and a hole through the vertical blade adjoining the tang. The outer end of the tang is fanned out and provided with a series of holes $h\ h$ which lie along an arc from the hole in the blade as a center to permit the handle to be bolted at the angle which the workman finds most convenient in operation. The blade has a straight horizontal lower edge from which a horizontal shear blade C projects at one side. The forward edge $e$ of the horizontal shear blade is sharpened and is preferably diagonal so as to make a shear cut as it is pushed horizontally under the sod. The direction of the inclination of this edge is such as to form an acute reëntered angle with the cutting edge $a$ of the vertical blade. The tool is formed from a single piece of sheet steel.

In the operation of truing the edge of a lawn the implement is held by the handle in the position illustrated and pushed forward at the junction of the lawn and driveway or other bare place along the line to which it is desired to trim so as to cut away any irregularities and encroachments in the growth of the grass along the edge, such growth being detached by the cutting edges of the vertical and horizontal blades and deflected away from the cut edge by the bent rear edge B. The straight sides of the vertical and the horizontal blades serve as guides to preserve a true line unwavering either in horizontal alinement or in grade. The side of either blade serves as a support for material acted on by the cutting edge of the other blade by reason of the direction of inclination of the cutting edges.

The implement can also be turned over and used for chopping, in which case the cutting edges $c$ and $d$ are brought into use, or it can be used for scoring or cutting turf to obtain sod from the lawn. When so used the implement is preferably drawn along by a rope attached to the handle near the point of attachment of the handle to the blade, and the cutting is effected by the cutting edge $a$. This requires an additional man, one to hold the handle at the rear and guide the implement while the other walks in front and draws on the rope.

What I claim as new and desire to secure by Letters Patent of the United States, is—

1. An edge cutter for lawns having in combination, a blade in a vertical plane with a forwardly and downwardly directed cutting edge, an upwardly and rearwardly extending handle attached to the blade, and a horizontal shear blade projecting at one side from the lower edge of the vertical blade with a diagonal cutting edge forming an acute reëntered angle with the vertical blade.

2. An edge cutter for lawns having in combination, a blade in a vertical plane with a forwardly and downwardly directed cutting edge, an upwardly and rearwardly extending handle attached to the blade, and a horizontal shear blade projecting at one side from the lower edge of the vertical blade with a cutting edge meeting and forming a reentered angle with the cutting edge of the vertical blade.

3. An edge cutter for lawns having in combination, a blade in a vertical plane with a sidewardly bent rear edge, an upwardly and rearwardly extending handle attached to the blade, and a horizontal shear blade projecting at one side from the lower edge of the vertical blade with a diagonal cutting edge forming an acute reëntered angle with the vertical blade.

4. An edge cutter for lawns having in combination, a blade in a vertical plane with a sidewardly bent rear edge and a forwardly and downwardly directed cutting edge, an upwardly and rearwardly extending handle attached to the blade, and a horizontal shear blade projecting at one side from the lower edge of the vertical blade with a cutting edge meeting and forming a reëntered angle with the cutting edge of the vertical blade.

Signed by me at New York, (borough of Manhattan) N. Y., this 29th day of June, 1908.

FREDERICK HEATHER.

Witnesses:
SAMUEL W. BALCH,
FRANK C. COLE.